Dec. 8, 1931.  E. P. BARTHOLOMAY  1,835,924
GAS METER
Filed Feb. 2, 1929
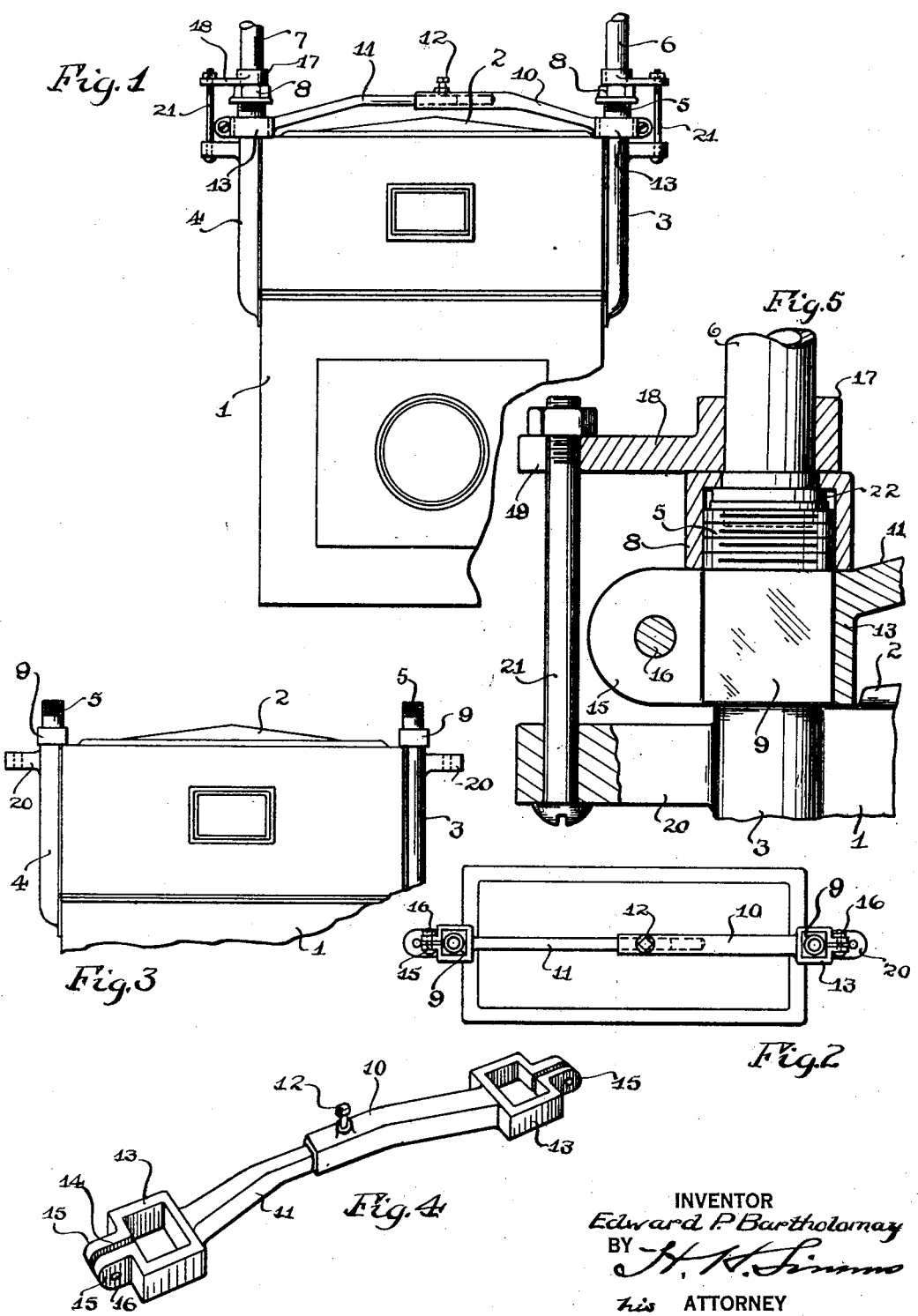

Patented Dec. 8, 1931

1,835,924

UNITED STATES PATENT OFFICE

EDWARD P. BARTHOLOMAY, OF ROCHESTER, NEW YORK

GAS METER

Application filed February 2, 1929. Serial No. 337,137.

The present invention relates to gas meters and more particularly to the type in which the inlet and outlet posts are secured to the opposite side walls of the meter and project beyond one end of the meter, the posts having coupling parts thereon to which the inlet and outlet pipings are coupled. An object of this invention is to provide a rigid connection between the posts below the coupling parts to prevent the posts being twisted off the side walls of the meter when the meter is connected to the inlet and the outlet piping, provision being made whereby the rigid connection is removable for the purpose of permitting the removal of the cover for the repair of the meter as well as the attachment of the inlet and outlet posts to the side walls of the meter before the side walls are assembled in the meter casing.

To this and other ends, the invention consists of certain parts and combinations of parts, all of which will be hereinafter described: the novel features being pointed out in the appended claim.

In the drawings:

Fig. 1 is a side view of a gas meter embodying the present invention;

Fig. 2 is a plan view;

Fig. 3 is a fragmentary view of the upper portion of the meter;

Fig. 4 is a perspective view of a rigid connection; and

Fig. 5 is a detailed sectional view showing the suspending connection between the meter posts and the service pipes.

In the making of gas meters, it is customary to solder the inlet and the outlet post to the opposite side walls of the meter casing before the side walls are assembled in the casing. The top of the casing is removable so that the interior parts of the gas meter may be reached for repair. In installing these meters, the workman is required, in order to obtain a proper connection between the inlet and outlet piping and the inlet and outlet posts, to exert a twisting stress on the inlet and outlet posts, and this stress, in some instances, is communicated to the connections between the inlet and outlet posts and the side walls of the casing causing the separation of the posts from the casing and injuring the meter. This invention contemplates a rigid connection between the inlet and outlet posts below the coupling parts thereon so that the twisting stress imparted to the posts during the installing of the meter are absorbed by the rigid connection and are not transmitted to the soldered connection between the inlet and outlet posts and the side walls of communication. This rigid connection is detachably connected to the inlet and outlet posts so that the inlet and outlet posts may be independently soldered to the side walls of the meter casing before the side walls are assembled in the meter and this detachable connection also permits the removal of the connection in order that the top wall of the meter may be removed to repair interior parts of the meter.

In the illustrated embodiment of the invention, 1 indicates the meter casing having a removable top 2. Inlet and outlet posts 3 and 4 respectively are attached to the opposite side walls of the meter casing in the usual manner.

The inlet and outlet posts 3 and 4 are each provided with coupling parts 8, in this instance, in the form of screw threaded portions 5 to which the inlet and outlet pipings 6 and 7 are connected respectively by coupling parts 8.

With the end in view of providing a rigid detachable connection between the posts 3 and 4, each post, in this instance, is provided, preferably above the meter but below the coupling part 8 thereon, with a noncircular portion 9 which, in this instance, is in the form of a rectangle. The connector, in this instance, is formed of two parts 10 and 11 fitting telescopically, one within the other, to provide for longitudinal adjustment for different sized meters, the two parts being held together by a set screw 12. At each end of this connection, there is provided a socket portion or sleeve 13 which has its bore or opening noncircular in cross section and conforming to the cross section of the noncircular portion 9 on the post with which it engages. In this instance, this socket portion or sleeve is split at 14 and provided with two ears 15 on opposite sides of the split connected together by clamping screws 16, thus forming two clamps at opposite ends of the connector. This arrangement permits each socket portion to be fitted to its post over the screw threaded coupling part and to be held in binding engagement with the noncircular portion 9 on such post. It is apparent that the two socket portions of the connector both engage the two posts and form a rigid connection between the posts. This connection is removable after the meter is disconnected from the pipings 6 and 7 so as not to interfere with the removal of the cover 2. The connector may also be employed as a carrying bar for the meter.

So as to remove the weight from the screw threads on the meter which is suspended from the service pipes 6 and 7, each service pipe is surrounded above its coupling part 8 by a sleeve 17 which has an arm 18 extended laterally therefrom and slotted or bifurcated at 19 at its outer end. A perforated lug or ear 20 is extended outwardly from the posts 3 and 4 and an adjustable bolt 21 connects each arm 18 with one of the lugs or ears 20 so that the weight of the meter is sustained by the flanges 22 on the lower end of the service pipes without placing any strain on the threads of the couplings between the meter posts and the service pipes.

What I claim as my invention and desire to secure by Letters Patent is:

The combination with a meter casing, of meter inlet and outlet posts secured to the sides of the casing and projecting above the top of the casing, a coupling part rigid with and forming the upper end of each post above the casing, a noncircular portion on each post below the coupling part, and a rigid connection having noncircular sleeves fitting the noncircular parts on the two posts.

EDWARD P. BARTHOLOMAY.